United States Patent [19]
Lonnemo

[11] 3,865,514
[45] Feb. 11, 1975

[54] POWER TRANSMISSION
[75] Inventor: Kurt R. Lonnemo, Troy, Mich.
[73] Assignee: Sperry Rand Corp., Troy, Mich.
[22] Filed: July 25, 1973
[21] Appl. No.: 382,427

[52] U.S. Cl................................. 417/212, 60/452
[51] Int. Cl............................................. F04b 49/00
[58] Field of Search .......... 417/212, 213, 218, 222; 60/445, 449, 450, 452

[56] References Cited
UNITED STATES PATENTS

| | | | |
|---|---|---|---|
| 2,892,311 | 6/1959 | Van Gerpen | 60/450 |
| 3,067,693 | 12/1962 | Lambeck | 417/219 |
| 3,289,605 | 12/1966 | Funk et al | 91/486 |
| 3,635,021 | 1/1972 | McMillen | 60/450 |
| 3,644,063 | 2/1972 | Bosch | 417/213 |

Primary Examiner—William L. Freeh
Assistant Examiner—G. P. LaPointe
Attorney, Agent, or Firm—Theodore Van Meter

[57] ABSTRACT

In a pressure compensated variable displacement pump for hydraulic power transmission systems, a start-up valve is provided for temporarily reducing the pump displacement to near zero to avoid imposing excessive torque upon the cranking motor of an internal combustion engine or upon a low starting torque electric prime mover driving the pump. The valve is applicable to pressure compensators of the type having a pilot circuit carrying a continuous bleed flow governed by a pressure responsive pilot relief valve. The start-up valve automatically bypasses the pilot relief valve when the system is at rest and for a predetermined interval during start-up of the prime mover.

5 Claims, 1 Drawing Figure

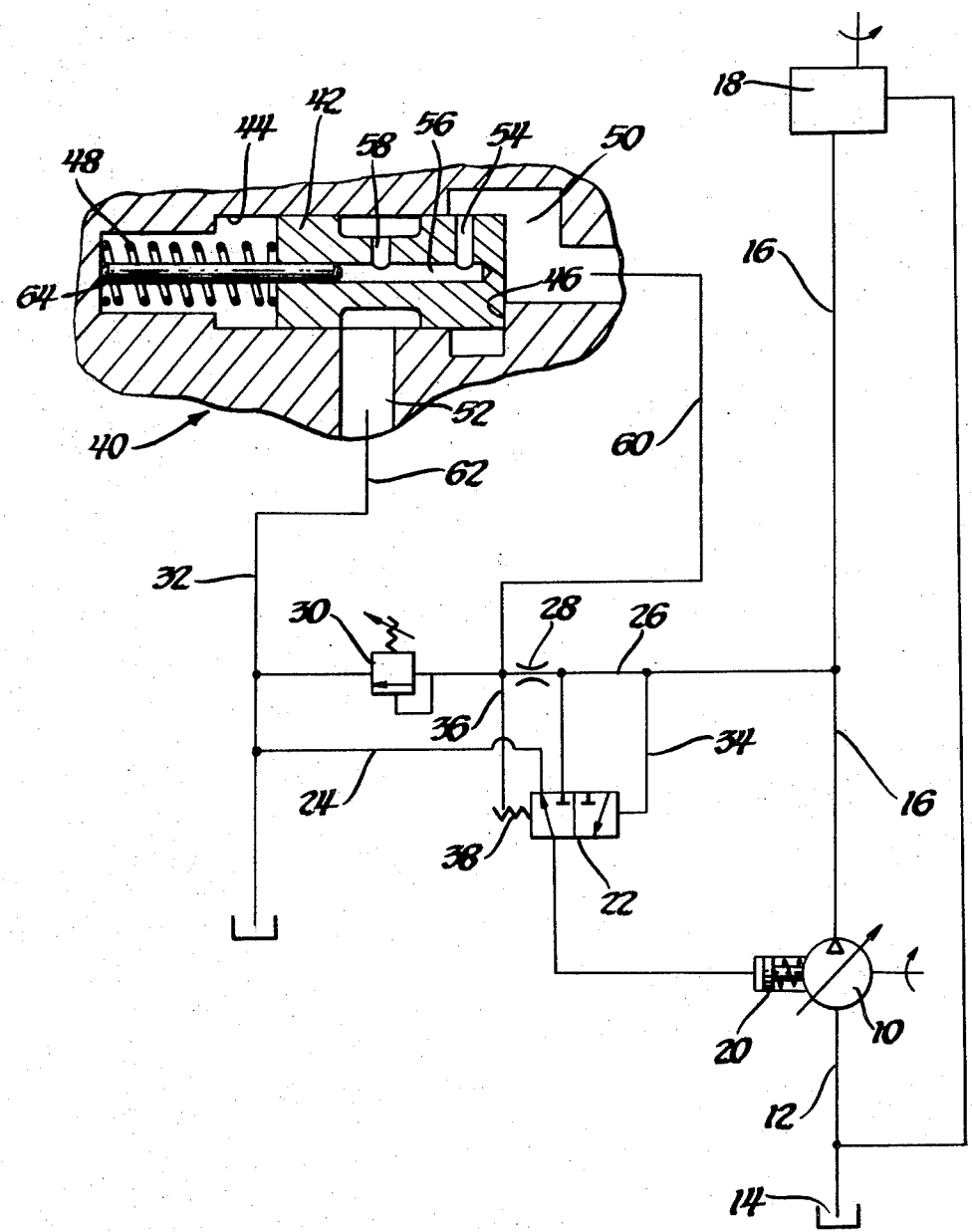

POWER TRANSMISSION

Engine driven pressure compensated pumps operating in closed center systems often prevent proper cranking of the engine due to the fact that full pressure has to be developed by the pump before it can begin to reduce the pump displacement. Thus, maximum torque is required by the pump which often exceeds the torque output of the cranking mechanism. Consequently, the engine cannot start without special arrangements being made. Among such arrangements are the use of a clutch to mechanically disengage the pump from the engine; the use of a full flow unloading valve which permits the pump flow to go back to the reservoir at minimum pump outlet pressure; and the use of a compensator which includes a valve for deactivating the normal compensator function and permits reduction of pump displacement at a minimum low pressure. Such a system as illustrated in the patent to Funk U.S. Pat. No. 3,289,605. All of these methods are costly and require extra plumbing and components, as well as some means for providing manually or automatically an external signal for actuating the start-up valve.

The present invention aims to provide an improved start-up valve particularly adaptable to pressure compensators of the type which are governed by a pilot relief valve functioning in a continuous flow bleed circuit. The invention aims to provide fully automatic start-up torque relief by a simple reliable low-cost start-up valve.

These things are achieved by the provision in a control system for a pressure compensated variable displacement hydraulic pump of the type having a spring biased, displacement reducing servomotor operated by a three-way pilot valve connected to the pump outlet and to exhaust and having a control circuit including a restrictor and a relief valve in series between the pump outlet and exhaust to carry a continuous bleed flow with the pilot valve responsive to the pressure drop through the restrictor, the improvement which includes a two-way start-up valve in parallel with the relief valve and biased to open position when not subjected to inlet pressure, together with hydraulic damping means for restricting the rate of closing of the start-up valve when subjected to inlet pressure.

In the drawing:

The single FIGURE is a diagrammatic circuit of a control system for a pressure compensated hydraulic pump incorporating a preferred form of the present invention.

In the embodiment diagrammatically illustrated, a variable displacement pressure compensated pump 10 has an intake line 12 from a reservoir 14 and an outlet line 16 for supplying a closed center type of hydraulic power consumption system indicated at 18. The displacement of pump 10 is varied by a hydraulic servomotor spring biased to maximum displacement position and operated by a three-way valve 22 for connecting the servomotor either to the exhaust line 24 in the position illustrated or to a pressure supply line 26 branching off from the pump outlet line 16. Thr branch 26 also feeds a continuous bleed circuit including a fixed restrictor 28 and a pressure responsive pilot relief valve 30 which discharges to the exhaust line 32. Actuation of the three-way valve is by means of branches 34 and 36 leading to its opposite ends together with a spring 38; making the valve responsive to the pressure drop across the fixed restrictor 28. The system thus far described is a well-known type and finds favorable application where close pressure regulation together with good dynamic response is required. It has the drawback, however, of imposing high starting torque upon the pump prime mover.

The present improvement includes the addition of a start-up valve generally designated 40 and comprising a spool 42 slidable in a bore 44 and normally biased to the right against a shoulder 46 by a spring 48. In this position, the valve is open from its inlet chamber 50 to its outlet chamber 52 through a restricted passage 54–56–58. The valve is connected by lines 60 and 62 in parallel with the pilot relief valve 30, and thus when open, bypasses the bleed circuit flow around the relief valve 30. A metering pin 64 has a predetermined clearance fit with the central bore in the spool 42 and meters the flow out of the left-hand end of bore 44 when the spool 42 moves to the left. Such movement is induced by pressure in the inlet 50 caused by the resistance to flow through passages 54, 56 and 58. The leftward movement of the spool 42 is permitted only by the escape of fluid from the left end of bore 44 around the metering pin 64. By suitable choice of the restrictions at 54 and at metering pin 64, the rate of movement of the spool toward closed position can be chosen at any desired value.

Thus, in operation with the system at rest, the start-up valve lies in the position illustrated, having been moved there at shut-down by the spring 48. Since the pin 64 is not connected to the body, this rightward movement may take place substantially instantly. This allows the pilot valve 22 to shift to the position illustrated which exhausts the servomotor 20 and shifts the pump displacement to full stroke. Upon starting the pump 10 with the closed center power system 18 closed off, the pump flow goes into branch 26 and because its volume is large relative to the normal small bleed volume carried by the fixed restrictor 28, only a small portion of it passes through this restrictor, the remainder going through branch 34 to first shift the pilot valve 22 and then continue on to the servomotor 20, thus rapidly reducing the stroke of the pump 10 to near zero. Thus the torque required to drive the pump during start-up of an internal combustion engine, for example, remains at a low value.

As the spool 42 moves to the left the port 54 is gradually closed. This allows full pressure to build up in the lines 60 and 36 thus restoring pilot valve 22 to its normal regulating function.

I claim:

1. In a control system for a pressure compensated variable displacement hydraulic pump of the type having a spring biased, displacement reducing, servo motor operated by a three-way pilot valve connected to the pump outlet and to exhaust and having a control circuit including a restrictor and a relief valve in series between the pump outlet and the exhaust to carry a continuous bleed flow with the pilot valve responsive to the pressure drop through the restrictor, that improvement which includes a two-way start-up valve in parallel with the relief valve and biased to open position when not subjected to inlet pressure, the position of the start-up valve controlling the pressure on the downstream side of the restrictor, which in turn positions the three-way pilot valve and hydraulic damping means for restricting the rate of closing of the start-up valve when subjected to inlet pressure.

2. A control system as defined in claim 1 wherein the start-up valve has a restricted passage between its inlet and outlet.

3. A control system as defined in claim 1 wherein the hydraulic damping means comprises a displacement chamber having a restricted connection with the exhaust.

4. A control system as defined in claim 1 wherein the start-up valve has a restricted passage between its inlet and outlet and the hydraulic damping means comprises a displacement chamber having a restricted connection with the exhaust.

5. A control system as defined in claim 4 wherein the restricted passage is larger than the restricted connection.

* * * * *